United States Patent [19]

Alexeev et al.

[11] 3,961,196

[45] June 1, 1976

[54] MINIATURE IONIZATION CHAMBER

[76] Inventors: Viktor Ivanovich Alexeev, ulitsa Verkhnyaya Krasnoselskaya, 34, kv. 87; Ivan Yakovlevich Emelyanov, Kutuzovsky prospekt, 2/1, kv. 110; Vladimir Maximovich Ivanov, Golyanovskaya ulitsa, 7, korpus 1, kv. 12; Leonard Vasilievich Konstantinov, ulitsa Boitsovaya, 17, korpus 1, kv. 30; Boris Vasilievich Lysikov, Universitetsky prospekt, 21, korpus 1, kv. 8; Viktor Viktorovich Postnikov, ulitsa Perovskaya, 22, korpus 4, kv. 32; Jury Viktorovich Rybakov, ulitsa Goncharova, 7, kv. 58, all of Moscow, U.S.S.R.

[22] Filed: July 30, 1974

[21] Appl. No.: 493,663

[30] Foreign Application Priority Data

Aug. 3, 1973 U.S.S.R. .............................. 1949732

[52] U.S. Cl. .............................. 250/385; 250/390; 313/61 D; 313/93

[51] Int. Cl.[2] .................... G01T 1/18; G01T 1/185

[58] Field of Search ............ 313/61 D, 93; 250/390, 250/374, 385

[56] References Cited

UNITED STATES PATENTS

| | | | |
|---|---|---|---|
| 2,436,084 | 2/1948 | Weller | 250/385 |
| 2,532,874 | 12/1950 | Anderson | 250/390 |
| 3,311,770 | 3/1967 | Boyd | 313/93 |

*Primary Examiner*—Harold A. Dixon
*Attorney, Agent, or Firm*—Holman & Stern

[57] ABSTRACT

A miniature ionization chamber having a gas-filled housing which accommodates a guard electrode made in the form of a hollow perforated cylinder. The cylinder is electrically associated with the intermediate coaxial conductor of a triaxial cable used as the lead-in of the ionization chamber. The gas-filled housing of the ionization chamber also accommodates a collecting electrode shaped as a rod electrically connected to the center conductor of the cable and to tubular members. The rod is disposed internally of the guard electrode and is electrically connected, by means of jumpers passing through the holes in the guard electrode, to the tubular members. The tubular members embrace the guard electrode and are spaced a certain distance apart along its entire length. Arranged intermediate of these tubular members are spacers secured to the guard electrode and fixing the collecting electrode throughout its length with respect to the housing of the ionization chamber.

6 Claims, 3 Drawing Figures

MINIATURE IONIZATION CHAMBER

BACKGROUND OF THE INVENTION

The present invention relates to instrumentation for measuring high-intensity neutron and gamma radiation at elevated temperatures, and more particularly to a miniature ionization chamber predominantly used for monitoring inside the cores of nuclear reactors.

Detectors used for monitoring, controlling and protecting nuclear reactors provided with relatively small cores and moderate output are normally arranged outside of the core or inside the reactor vessel in specially cooled channels.

The development of high-energy power and research reactors operating high neutron fluxes (about $5.10^{14}$ neutrons/sq cm/sec) and at elevated temperatures (up to 700°–800°C) has made it urgent to monitor the intensity and distribution of the energy liberated inside the core, as detectors arranged outside the core are becoming less sensitive to local surges of the neutron flux. At the same time, the power of reactors has to be limited so as to protect fuel elements against uncontrolled surges of energy and prevent accidents.

This consideration has prompted intensive studies with a view to providing neutron detectors permitting monitoring inside the cores of nuclear power reactors.

The high cost and complexity of cooled monitoring devices have become another factor contributing to the development of high-temperature neturon detectors.

Meters based on the application of activation methods (activation of foil, wire, etc) are unsuitable for routine monitoring of energy liberation, especially in control and protection systems.

Among the great variety of the currently used neutron detectors for monitoring inside reactors, the widest application is found by ionization chambers and emission detectors.

Emission detectors are simple in design and reliable in operation. However, they are generally characterized by slow response, and those characterized by fast response produce a signal which becomes commensurable with background currents at temperatures of about 400°–500°C. This restricts their application in reactor control and protection systems.

Ionization chambers, on the other hand, are characterized by fast response and can operate at high temperatures. The neutron-sensitive coating of ionization chambers may comprise a combination of fissile isotopes, whereby an ionization chamber may operate in high thermal fluxes over a long period of time without its sensitivity being impaired.

All ionization chambers, regardless of their type, purpose and structure, are provided with a collecting electrode energized by an external power supply. This electrode is insulated from the other structural elements of the chamber. A decrease in the interelectrode insulation resistance to a certain value adversely affects the operation of the ionization chamber and may ultimately result in its failure.

In developing ionization chambers capable of operating at elevated temperatures and in high ionizing radiation fields, designers followed two directions: first, they tried to enhance the thermal radiation stability of the interelectrode insulation, second, they sought a solution of the problem of reducing leakage currents. In the United States, in France, and in the Federal Republic of Germany, for example, ionization chambers have been developed using insulating materials with a high dielectric constant and capable of operating at a temperature as high as 600°C.

The use of insulators with a great surface area to reduce surface leakage currents or increase the volume of the insulating material used in the chamber also contributed to a higher thermal and radiation stability.

However, for ionization chambers currently used in nuclear engineering, the working temperature of 600°C is practically the maximum above which they are ineffective. This is due to the fact that under the effect of intensive ionizing radiation fields and elevated temperatures the interelectrode insulation loses its insulating properties and becomes a source of background current limiting the temperature range of operation and reducing the reliability of the chamber. Even insulating materials featuring the highest thermal radiation stability known at present, based on superpure alumina, become electrically conducting at temperatures above 600°C.

The search for new structural designs has lead to the development of a high-temperature ionization chamber with a guard electrode. However, the construction of this chamber solves the problem but partially, since the guard electrode made up of two rings interconnected through jumpers and arranged on spacers made of an insulating material is disposed internally of the chamber. In this embodiment, leakage currents are only eliminated inside the chamber and not at its input. As a result, it is impossible to reduce the size of the ionization chamber radially which substantially narrows the field of its application.

In some ionization chambers, the guard electrode is disposed at the input to the chamber, which in no way solves the problem of eliminating leakage currents inside the chamber. This does not permit extensively using such an ionization chamber, especially in reactors wherein the in-core temperature exceeds 600°C.

Another small-size ionization chamber is known whose lead-in is made as a triaxial cable and whose gas-filled housing accommodates a collectng electrode electrically connected to the centre conductor of this cable, the electrode being fixed lengthwise with respect to the housing by means of spacers, and a guard electrode for reducing leakage currents appearing under the effect of ionizing radiation and high temperature.

The intermediate coaxial conductor of the triaxial cable being used in this ionization chamber as the guard electrode substantially (by 2 to 3 orders of magnitude) alleviates the requirements imposed on the insulation of this cable. However, the presence inside the chamber housing of a spacer made from an insulating material, and the absence of the guard electrode therein, restricts the field of its application to a temperature of about 600°C and the disintegration of the insulating material under the effect of the ionizing radiation field shortens the life of the ionization chamber.

SUMMARY OF THE INVENTION

It is an object of the present invention to provide a miniature ionization chamber highly reliable at prolonged exposure to intensive ionization radiation fields and elevated temperatures in the order of 600° to 800°C.

This object is attained by that in a miniature ionization chamber having a lead-in in the form of a triaxial cable, the grounded gas-filled housing whereof accomodates a collecting electrode electrically connected to the centre conductor of said cable having an intermediate coaxial conductor. The collecting electrode is fixed lengthwise with respect to the housing by means of spacers, and a guard electrode for reducing leakage currents appears under the effect of ionizing radiation and high temperatures. The guard electrode is, according to the invention, made in the form of a hollow perforated cylinder electrically associated with the intermediate coaxial conductor of the triaxial cable, and the collecting electrode is made in the form of a rod disposed internally of the guard electrode and insulated therefrom. Tubular members are electrically connected to the rod by means of jumpers passing through the holes of the guard electrode, the surface of these tubular members serving as the working surface of the collecting electrode. The tubular members embrace said guard electrode, are insulated therefrom, and spaced a certain distance apart from one another along its entire length, with spacers being arranged intermediate of the tubular members and secured to the guard electrode.

It is expedient that the electrodes and spacers be made integral with the triaxial cable in such a manner that annular recesses made in the cable along its entire length at a certain distance from one another, having a rectangular longitudinal section and a depth determined by the spacing between the outer and intermediate coaxial conductors of the cable, divide the outer coaxial conductor of the cable into alternating portions, one of which, provided with at least one projection, serves as a spacer and the surface of the other portion serves as the collecting electrode working surface, with the intermediate coaxial conductor of the cable serving as the guard electrode.

The working surface of the collecting electrode should preferably be coated with a neutron-sensitive substance, while the side surface of the recesses should preferably be clad with radiation stable metal-reinforced ceramics.

The proposed miniature ionization chamber is highly reliable at prolonged exposure to intensive ionizing relation fields and temperatures as high as 600 to 800°C. The diameter of the proposed ionization chamber is about 5 to 6 mm and its length depends on its particular application and may vary from a few tens of millimeters to 7 meters and more.

BRIEF DESCRIPTION OF THE DRAWINGS

The invention will now be described in greater detail with reference to preferred embodiments thereof, taken in conjunction with the accompanying drawings, wherein.

DESCRIPTION OF THE PREFERRED EMBODIMENT

Figure 1:
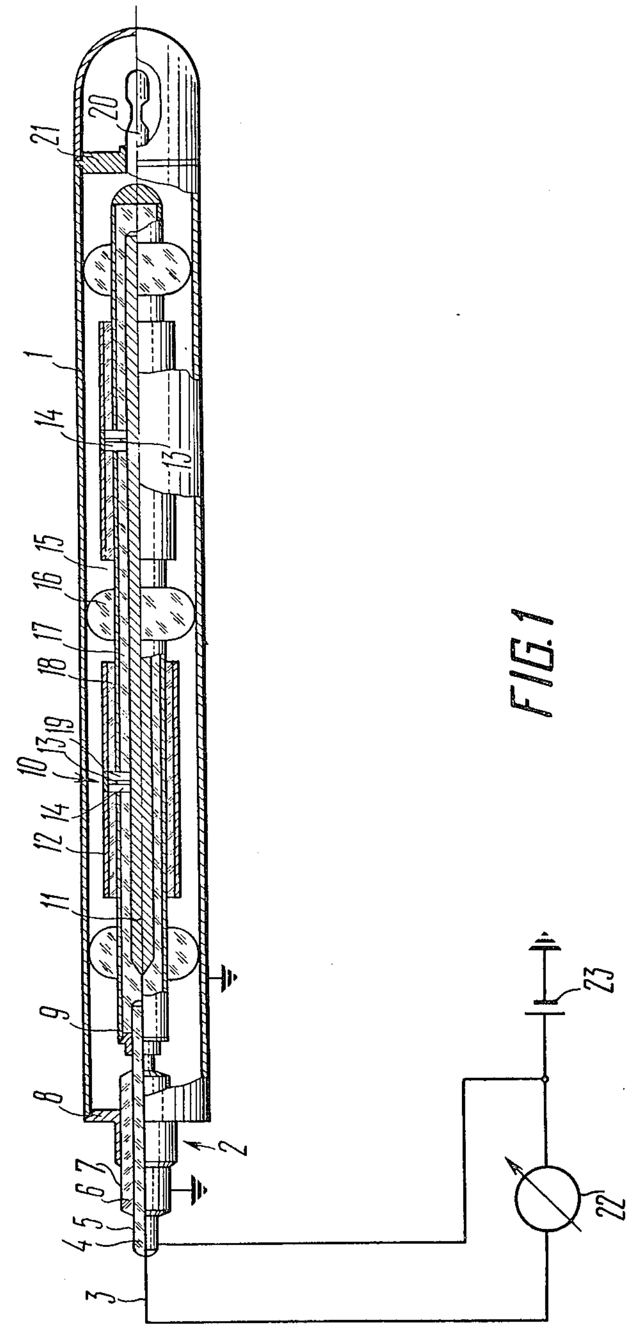
FIG. 1 shows schematically, in longitudinal section, a miniature ionization chamber, according to the invention.

Referring now to FIG. 1, the proposed miniature ionization chamber comprises a hermetically sealed cylindrical housing 1 made of a thermostable and radiation resistant conducting material, in this particular embodiment of stainless steel. A lead-in 2, entering the housing 1, is made as a triaxial cable with a centre conductor 3 separated by an insulating layer 4 from an intermediate coaxial conductor 5 which, in turn, is separated by an insulating layer 6 from an outer coaxial conductor 7 of this triaxial cable. The centre conductor 3 and coaxial conductors 5 and 7 of the cable are, in this embodiment, made of stainless steel, and the insulating layers 4 and 6 are made of pressed magnesia powder.

The lead-in 2 is sealed to the housing 1 through an adapter piece 8.

The housing 1 of the ionization chamber accomodates a guard electrode 9 for reducing leakage currents appearing under the effect of ionizing radiation and elevated temperatures, as well as a collecting electrode 10. The guard electrode 9 is made as a hollow cylinder the length whereof is determined by that of the housing 1, and one end whereof is soldered to the intermediate coaxial conductor 5 of the lead-in 2. The collecting electrode 10 is of complex configuration: it is made in the form of a current-conducting rod 11 and tubular members 12 arranged coaxially therewith. Each tubular member 12 is coupled to the rod 11 through a jumper 13 passing through a respective hole 14 made in the guard electrode 9, with the tubular members 12 being spaced a certain distance apart along the entire length of the electrode 9 and embracing the electrode 9. Arranged in spacings 15 between the ends of the tubular members 12 are spacers 16 made of an insulating material, secured to the guard electrode 9, and intended to affix the collecting electrode 10 with respect to the housing 1.

The current-conducting rod 11 of the collecting electrode 10 is connected to the centre conductor 3 of the leadin 2.

Thus, the electrodes 9 and 10 are arranged coaxially inside the housing 1. The rod 11 of the collecting electrode 10 is arranged internally of the guard electrode 9, while the tubular members 12, the surfaces whereof serve as the working surface of the collecting electrode 10, embrace the guard electrode 9. Placed intermediate of the electrodes 9 and 10 are insulating layers: insulating layer 17 between the rod 11 and the guard electrode 9, and insulating layer 18 between the guard electrode 9 and the tubular members 12.

The jumpers 13 passing through the holes 14 made in the guard electrode 9 are insulated therefrom by a spacing 19.

The housing 1 of the ionization chamber is filled with an inert gas, in this particular embodiment, with argon. For the inert gas to be pumped in and out of the chamber 1, the latter is provided with a fitting 20 secured in partition 21 of the housing 1.

The ionization chamber is connected to a measuring instrument 22 and a power supply 23, which, in this case, is a source of direct voltage, through the lead-in 2 which is a triaxial cable. The center conductor 3 of the lead-in 2 is connected to the power supply 23 via the measuring instrument 22, which is a conventional galvanometer. The intermediate coaxial conductor 5 of the lead-in 2 is coupled to the power supply 23 bypassing the measuring instrument 22. The outer coaxial conductor 7 of the lead-in 2 is grounded.

To enable measurement of the neutron flux, the surface of the tubular members 12 is coated with a neutron-sensitive substance which, in this case, is uranium enriched with uranium-235.

The proposed miniature ionization chamber may have another embodiment in many respects similar to the one described herein above.

The difference resides in that the guard and collecting electrodes and the spacers are made integral with the lead-in, which is a triaxial cable.

Figures 2, 3:
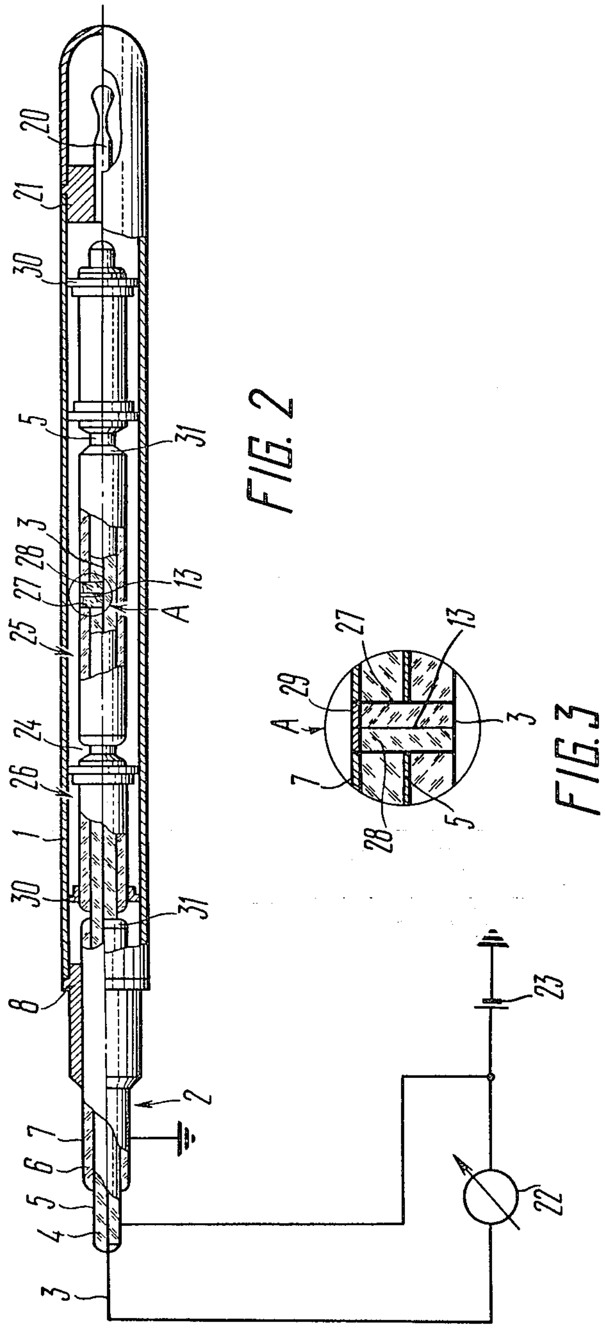
FIG. 2 is a longitudinal section view of another embodiment of the minature ionization chamber using a triaxial cable, according to the invention.
FIG. 3 is an enlarged view of portion A of FIG. 2.

Made in the triaxial cable placed along the housing 1 (FIG. 2) are annular recesses 24 rectangular in longitudinal section. The depth of the recesses 24 is determined by the spacing between the outer and intermediate coaxial conductors 7 and 5 of the triaxial cable. The annular recesses 24 divide the outer coaxial conductor 7 into alternating portions 25 and 26. Made in the portions 25 are radial channels 27 the depth whereof is determined by the spacing between the outer coaxial conductor 7 of the cable and its centre conductor 3. Arranged in each of said channels 27 (FIG. 3) is a current-conducting jumper 13 interconnecting the centre conductor 3 and outer coaxial conductor 7, and insulated by a bush 28 placed in the channel 27 from the guard electrode which, in this embodiment, is the intermediate coaxial conductor 5 of the triaxial cable. The bushing 28 is made of ceramics based on alumina powder. Each channel 27 is hermetically sealed by a cover 29 arranged level with the outer coaxial conductor 7 and made, just as the latter, of stainless steel.

In this embodiment, the portions 25 of the outer coaxial conductor 7 of the triaxial cable (FIG. 2) serve as the working surface of the collecting electrode.

The ends of each portion 26 are provided with projections in the form of two metal rings 30 attached to the outer coaxial conductor 7 of the cable. The triaxial cable being inside the housing 1, the projections are in contact therewith, thus ensuring a permanent gas gap between the working surface of the collecting electrode and the housing 1. Hence, the portions 25 serve as spacers, and at the same time they insulate the guard electrode, which is the intermediate coaxial conductor 5 of the triaxial cable, from the housing 1 of the ionization chamber. This additional function performed by the spacers 25 is further promoted by the presence of the insulating layer 6 of the cable. To provide for higher mechanical strength of this layer 6, the side surfaces of the recesses 24 are coated with radiation resistant metal-reinforced ceramics, in this case ceramics based on alumina powder.

The length of the portions 25 and 26 is determined by the required sensitivity, mechanical strength and reliability of the ionization chamber.

Both embodiments of the proposed miniature ionization chamber operate in a similar manner, therefore, only the operation of the second embodiment will be considered below.

To measure the intensity of gamma radiation, applied to the centre conductor 3 (FIG. 2) of the triaxial cable is a positive voltage from the power supply 23 via the measuring instrument 22. At the same time, a voltage equal to that across the conductor 3 is applied from the power supply 23 to the intermediate coaxial conductor 5 of the triaxial cable bypassing the measuring instrument 22. Thus, the coaxial conductor 5 serves as the guard electrode intended to reduce leakage currents.

Under the effect of gamma radiation, the electrons knocked out of the walls of the housing 1 ionize the argon in the gap between the housing 1 and the triaxial cable. Negatively charged particles are collected by the working surface of the collecting electrode, i.e. portions 25 of the outer coaxial conductor 7 of the triaxial cable, which is under the positive potential of the conductor 3 with respect to the housing 1. The current proportional to the ionizing radiation intensity is measured by the instrument 22 connected into the circuit of the conductor 3 of the cable.

However, under the effects of ionizing radiation and high temperatures, leakage currents appear flowing through the insulating layers 4 and 6 between the collecting electrode and housing 1, as well as between the guard electrode and housing 1.

At temperatures ranging from 600° to 800°C, high radiation intensities in the order of $5.10^9$ r/hr and prolonged operation (up to 25,000 hours), the ionization chamber leakage currents become commensurate with the ionization currents being measured and the ionization chamber becomes inoperative. Therefore, the requirements imposed on the resistance of the insulation used in ionization chambers are most stringent.

In the above-described embodiments of the ionization chamber, due to the guard electrode being arranged throughout its length and energized with a voltage equal to that across the collecting electrode, the potential difference between these electrodes is near zero. This permits substantial reduction of the leakage currents flowing through the insulating layers 4 and 6 between the collecting electrode and housing 1 as well as to alleviate the requirements imposed on the insulation resistance by 3 to 4 orders of magnitude, whereby the reliability and durability of the ionization chamber are substantially enhanced.

Leakage currents also appear across the portions 26 through the insulating layer 6 between the housing 1 and collecting electrode. That is the intermediate coaxial conductor 5. The effect of these currents on the readings of the measuring instrument 22 is eliminated by the supply voltage being applied to the guard electrode bypassing said instrument 22.

As a result, the leakage currents only load the power supply 23 and in no way affect the readings of the measuring instrument 22.

The operation of an ionization chamber used for measurement of neutron fluxes is similar to the one described above.

The only difference is that ionization of the argon in the gap between the housing 1 and the triaxial cable is due to fission fragments. The latter are formed due to the interaction of neutrons with the neutron-sensitive coating applied to the working surface of the collecting electrode.

The proposed arrangement of the miniature ionization chamber substantially extends the operating temperature range (up to 800°C) and prolongs the service life (up to an integrating flux of about $5.10^{21}$ neutrons per sq cm.). This is attained by that the guard electrode aiding the interelectrode insulation is arranged throughout the length of the housing 1.

With a relatively small outer diameter (no more than 6 mm), the ionization chamber may be made of practically any required length.

Depending on the purpose of the ionization chamber type and design of the reactor core, the length of the sensitive section of the chamber may vary from a few tens of millimeters, in the case of differential measurements, to 7 meters and more, in the case of measurement of the power of the entire process tube of a high-energy power reactor.

The ability to reliably operate at elevated temperatures and in intensive radiation fields over long periods of time plus structural flexibility render the proposed ionization chamber a most adequate instrument for in-core measurements.

What is claimed is:

1. A miniature ionization chamber comprising, in combination: a grounded housing; a gas filling said housing; a lead-in to the housing made in the form of a triaxial cable secured in said housing, the triaxial cable including an intermediate and an outer coaxial conductor; a guard electrode for reducing ionization chamber leakage currents, the guard electrode accommodated in said housing and made in the form of a hollow cylinder electrically associated with said intermediate coaxial conductor of said triaxial cable; holes provided in said hollow cylinder; the triaxial cable further including a centre conductor; a collecting electrode accommodated in said housing; a metal rod forming part of said collecting electrode and disposed internally of said hollow cylinder and insulated therefrom, said rod being electrically connected to said centre conductor of said triaxial cable; tubular members also forming part of said collecting electrode, the surface whereof serves as the working surface of the collecting electrode, said tubular members embracing said hollow cylinder, being insulated therefrom, and spaced a certain distance apart along the entire length of said hollow cylinder; jumpers passing through said holes made in said hollow cylinder and electrically interconnecting said tubular members and metal rod forming part of said collecting electrode; and spacers arranged intermediate of said tubular members, secured to said hollow cylinder, and affixing said collecting electrode with respect to said housing.

2. An ionization chamber as claimed in claim 1, wherein said working surface of said collecting electrode is coated with a neutron-sensitive substance.

3. An ionization chamber as claimed in claim 2, wherein the ends of said tubular members of said collecting electrode are clad with radiation resistant metal-reinforced ceramics.

4. A miniature ionization chamber comprising, in combination: a grounded housing; gas filling said housing; a triaxial cable accommodated in said housing along its entire length, with a gap being provided between said housing and triaxial cable; the triaxial cable including an outer coaxial conductor and an intermediate coaxial conductor of said triaxial cable, the latter serving as a guard electrode for reducing ionization chamber leakage currents; annular recesses, rectangular in longitudinal section, running along the entire triaxial cable at a certain distance from one another and having a depth determined by the spacing between said outer and intermediate coaxial conductors of said triaxial cable; said outer coaxial conductor of said triaxial cable being divided into alternating portions; said triaxial cable further including a centre conductor, channels formed in each of one of said alternating portions of said triaxial cable, the depth of the channel being determined by the spacing between said outer coaxial and centre conductors of said triaxial cable; the surface of said portions in which said channels are formed serving as the collecting electrode working surface; at least one projection made on the other one of said alternating portions of said outer coaxial conductor, which portion serves, together with said projection, as a spacer for positioning said collecting electrode with respect to said housing; and a lead-in to the ionization chamber made integral with said triaxial cable.

5. An ionization chamber as claimed in claim 4, wherein said working surface of said collecting electrode is coated with a neutron-sensitive substance.

6. An ionization chamber as claimed in claim 5, wherein the side surface of said recesses is clad with radiation resistant metal-reinforced ceramics.

* * * * *